US012565621B2

(12) United States Patent
Franca et al.

(10) Patent No.: US 12,565,621 B2
(45) Date of Patent: Mar. 3, 2026

(54) NANOPARTICLES AND POLYMERS FOR CONTAMINANT REMOVAL

(71) Applicant: Baker Hughes Oilfield Operations LLC, Houston, TX (US)

(72) Inventors: Leonardo Franca, Katy, TX (US); Radhika Suresh, Sugar Land, TX (US); Rostyslav Dolog, Houston, TX (US); Joseph Arensdorf, Conroe, TX (US); Griffin Koehler, Santa Fe, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 129 days.

(21) Appl. No.: 18/381,118

(22) Filed: Oct. 17, 2023

(65) Prior Publication Data

US 2025/0122429 A1 Apr. 17, 2025

(51) Int. Cl.
| | |
|---|---|
| *C10G 33/04* | (2006.01) |
| *C02F 1/28* | (2023.01) |
| *C10G 25/00* | (2006.01) |
| *C10G 31/08* | (2006.01) |

(52) U.S. Cl.
CPC .............. *C10G 33/04* (2013.01); *C02F 1/281* (2013.01); *C02F 1/285* (2013.01); *C02F 1/286* (2013.01); *C02F 1/288* (2013.01); *C10G 25/003* (2013.01); *C10G 31/08* (2013.01); *C10G 2300/1033* (2013.01); *C10G 2300/205* (2013.01); *C10G 2300/44* (2013.01)

(58) Field of Classification Search
CPC ..... B60C 2011/0369; B60C 2011/1213; C02F 1/281; C02F 1/285; C02F 1/286; C02F 1/288; C02F 2103/365; C02F 2305/08; C10G 2300/1033; C10G 2300/205; C10G 2300/44; C10G 25/003; C10G 31/08; C10G 33/04
See application file for complete search history.

(56) References Cited

U.S. PATENT DOCUMENTS

| | | | |
|---|---|---|---|
| 4,814,088 A | 3/1989 | Kutowy et al. | |
| 8,425,765 B2 | 4/2013 | Kremer et al. | |
| 8,567,502 B2 | 10/2013 | O'Malley et al. | |
| 8,647,479 B2 | 2/2014 | Lean et al. | |
| 9,624,113 B2 | 4/2017 | Kubala et al. | |
| 10,131,830 B1 | 11/2018 | Mahfouz et al. | |
| 10,364,397 B2 | 7/2019 | Al Hamouz et al. | |
| 11,667,851 B1 * | 6/2023 | Franca | C10G 31/08 |
| | | | 208/253 |
| 2007/0262027 A1 | 11/2007 | Krogue et al. | |
| 2009/0032472 A1 | 2/2009 | Krogue et al. | |
| 2014/0339137 A1 | 11/2014 | Vollmer et al. | |
| 2017/0129784 A1 | 5/2017 | O'Rear et al. | |
| 2018/0065125 A1 | 3/2018 | Komati | |
| 2020/0368640 A1 | 11/2020 | Adewunmi et al. | |

FOREIGN PATENT DOCUMENTS

| | | | |
|---|---|---|---|
| CN | 101171064 B | 10/2012 | |
| CN | 106045185 A | 10/2016 | |
| CN | 104817192 B | 2/2018 | |
| CN | 211497038 U | 9/2020 | |
| CN | 110282804 B | 1/2021 | |
| CN | 112370817 A | 2/2021 | |
| CN | 112520911 A | 3/2021 | |
| CN | 109097094 B | 4/2021 | |
| RU | 2443754 C1 | 2/2012 | |

OTHER PUBLICATIONS

Abdel-Fatah, Mona M., et al., "Water Treatment and Desalination", IntechOpen, Desalination—Challenges and Opportunities, Mar. 2020, 1-17.
Ko, Saibom , "Oil Droplet Removal from Produced Water Using Nanoparticles and Their Magnetic Separation", SPE-181893-MS, Society of Petroleum Engineers, Sep. 2019, 1-19.
International Search Report and Written Opinion for PCT/US2024/051624 mailed Jan. 24, 2025.
Dadari Soheil, et al., "Crude Oil Desalter Effluent Treatment Using High Flux Synthetic Nanocomposite NF Membrane-optimization by Response Surface Methodology", Journal of Desalination; Sep. 2018; 34-46.
Konne, Joshua L., et al., "Remediation of Nickel from Crude Oil Obtained from Bomu Oil Field Using Cassava Waste Water Starch Stabilized Magnetic Nanoparticles", Energy and Environment Research; 4:1; Jan. 2014; 25-31.

(Continued)

*Primary Examiner* — Ellen M Mcavoy
*Assistant Examiner* — Chantel Graham
(74) *Attorney, Agent, or Firm* — Baker Hughes Company

(57) ABSTRACT

A treatment formulation for removing target impurities from a system can include a synergistic combination of a polymer and a nanoparticle compound. In one aspect, a treatment formulation includes a contaminant removal agent and a solvent. The contaminant removal agent of one embodiment includes at least one nanoparticle compound, and suitable nanoparticle compounds are nitrides, oxide nanoparticles, clays, and carbon-based nanoparticles. In another embodiment, the contaminant removal agent includes at least one polymer. Suitable polymers are sulfonated PEEK polymer, sodium carboxy cellulose, poly(ethylene glycol) diamine, polyvinyl pyrrolidone functionalized with sodium salt of chloroacetic acid, polyvinyl pyrrolidone functionalized with propyl sulfonate, polyethyleneimine, 4-aminonapthalene-sulfonic acid, 3-(1-pyridino)-1-propanesulfonate, and octa-decylphosphonic acid. In another aspect, methods for removing a target impurity from a fluid involve identifying the target impurity, providing a contaminant removal agent with at least one polymer and at least one nanoparticle compound, and contacting the fluid with the contaminant removal agent.

19 Claims, No Drawings

(56)       References Cited

OTHER PUBLICATIONS

Tiwari, Sakshi , et al., "A novel bio-sorbent comprising encapsulated Agrobacterium fabrum (SLAJ731) and iron oxide nanoparticles for removal of crude oil co-contaminant, lead Pb(II)", Journal of Environmental Chemical Engineering; http://dx.doi.org/10.1016/j.jece.2016.12.017; Feb. 2017; 43pp.

* cited by examiner

NANOPARTICLES AND POLYMERS FOR CONTAMINANT REMOVAL

FIELD OF THE INVENTION

This invention generally relates to contaminant mitigation and, more particularly, but not by way of limitation, to formulations and methods for removing contaminants from a fluid such as a crude oil.

BACKGROUND OF THE INVENTION

Crude oil is often contaminated with water, inorganic salts, suspended solids, and water-soluble trace metals. To reduce corrosion, plugging, and fouling of equipment and to prevent poisoning the catalysts in processing units, refineries must remove these contaminants, in particular water and associated salts, by a desalting process. To remove unwanted contaminants, crude oil is initially mixed with fresh water (or "wash water") to form an emulsion, and contaminants from the crude oil partition into the emulsified water. Demulsifiers are also injected to break the emulsion into oil and water phases before the blend of crude oil and wash water flows into a desalter.

Once the oil-water-demulsifier blend flows into the desalter, charged electrical grids further promote water droplet coalescence and cause the water to migrate downward in the desalter vessel. The resulting dry and purified desalted crude is then pulled out of the top of the desalter and sent to distillation towers, while the water (now laden with contaminants) exits from the desalter's bottom as a brine.

While the emulsion with wash water removes some contaminants from the crude oil, this process is unable to remove many contaminants such as nickel, manganese, phosphorous, and vanadium. These contaminants are believed to be tightly bound to the hydrocarbons (e.g., vanadium bound to porphin rings) and, therefore, are not removed in the desalter brine. The force required to break the bonds between these contaminants and hydrocarbons can be substantial, and the problem is made more complex when the contaminants are present in different oxidation states. Failure to effectively remove contaminants from the desalted crude causes operational problems in downstream processing.

The current methods to remove these contaminants in the desalting process rely primarily on introducing higher doses of regular demulsifiers, thereby increasing operating costs. Even at high doses, these demulsifiers have low removal efficiency, in particular, for metals. A need exists, therefore, for effective chemical intervention to remove contaminants, including tightly bound metals, from crude oil in the refinery desalting process. The present disclosure is directed at these and other deficiencies in the prior art.

SUMMARY OF THE INVENTION

In one aspect, a treatment formulation is disclosed for removing a target impurity from a system, where the treatment formulation includes a contaminant removal agent and a solvent, and the contaminant removal agent includes at least one nanoparticle compound. Suitable nanoparticle compounds are nitrides, clays, carbon-based nanoparticles, and combinations of the same.

In another aspect, a treatment formulation is disclosed for removing a target impurity from a system, where the treatment formulation includes a contaminant removal agent and a solvent, and the contaminant removal agent includes at least one polymer. Suitable polymers are sulfonated polyether ether ketone (PEEK) polymer, sodium carboxy cellulose, poly(ethylene glycol) diamine, polyvinyl pyrrolidone functionalized with sodium salt of chloroacetic acid, polyvinyl pyrrolidone functionalized with propyl sulfonate, polyethyleneimine, 4-aminonapthalenesulfonic acid, 3-(1-pyridino)-1-propanesulfonate, and octadecylphosphonic acid.

In yet another aspect, methods are disclosed for removing a target impurity from a fluid. The disclosed methods include the steps of identifying the target impurity in the fluid, providing a contaminant removal agent to remove the target impurity, and contacting the fluid with the contaminant removal agent. The contaminant removal agent includes at least one polymer and at least one nanoparticle compound, and the at least one nanoparticle compound is a nitride, oxide nanoparticle, clay, carbon-based nanoparticle, or a combination of the same.

DETAILED DESCRIPTION

It has been discovered that certain nanoparticles and polymers can be used to target and remove contaminants from a fluid. These nanoparticles/polymers have been identified as particularly useful for the removal of contaminants such as calcium, chlorine, chromium, manganese, mercury, nickel, phosphorus, potassium, vanadium, and zinc. Further, these nanoparticles and polymers are effective at low dosages compared to traditional chemistries.

For the removal of contaminants from crude oil, the identified nanoparticles and/or polymers may be introduced during the desalting process, where they cause contaminants to separate from the oil phase and partition into desalter brine. Certain contaminants are difficult to remove from crude oil due to complexes formed with ligands present in the hydrocarbons. It is anticipated that the identified nanoparticles and polymers employ one of two mechanisms (or both) to remove these contaminants. First, due to high surface activity, certain nanoparticles and polymers pull contaminants into the water phase by penetrating the interface, creating surface tension gradients, and disrupting the interface and/or complexes. Mechanisms such as charge disruption and the binding together of portions of the disrupted complexes may be employed by the nanoparticles and polymers to accomplish this attack on the interface. When the contaminants are freed from the complexes, they can be washed out of the crude oil and into the water phase.

As a second mechanism, certain functionalized nanoparticles and polymers bind metal ions and pull them away from the hydrocarbons and into the water phase. In some instances, the bond between the hydrocarbon and metal ion may not be broken, but the interaction of the nanoparticles and/or polymers with the metal ions will pull the latter into the water phase, though still attached to the hydrocarbons.

With the foregoing in mind, in one embodiment, a treatment formulation is disclosed for removing a target impurity from a system. In certain embodiments, the system is a fluid, such as a crude oil or a wastewater stream. The treatment formulation includes a contaminant removal agent and may additionally include a solvent. The contaminant removal agent component includes at least one nanoparticle compound, at least one polymer, or a combination thereof. In several embodiments, a combination of one nanoparticle compound or polymer with another nanoparticle compound or polymer is made in a ratio of about 1:1. As used herein, "compound" refers to a substance composed of a plurality of molecules which, in some instances, may be identical.

Suitable nanoparticles for the contaminant removal agent include nitrides, oxide nanoparticles, clays, and carbon-based nanoparticles. In some embodiments, carbon nitride and boron nitride are used as nitrides. In other embodiments, the oxide nanoparticles that are used for the contaminant removal agent include alumina, zinc oxide, iron (III) oxide, titania, and ammonium functionalized silica nanoparticles. The clays that are appropriate for the contaminant removal agent include dimethyldiallyl nanoclay, phyllosilicate, and bentonite. Suitable carbon-based nanoparticles include $NH_2$ functionalized graphene, graphene oxide, and $O_2$ rich multiwalled carbon nanotube (MWCNT).

Where the contaminant removal agent component includes at least one polymer, suitable polymers include sulfonated polyether ether ketone (PEEK) polymer, sodium carboxy cellulose, poly(ethylene glycol) diamine, polyvinyl pyrrolidone functionalized with sodium salt of chloroacetic acid, polyvinyl pyrrolidone functionalized with propyl sulfonate, and polyethyleneimine. In some embodiments, the at least one polymer may be a surfactant, including but not limited to 4-aminonapthalenesulfonic acid, 3-(1-pyridino)-1-propanesulfonate, or octadecylphosphonic acid.

It will be appreciated that certain contaminant removal agents offer better performance for removing specific contaminants than others do. The target impurity may include one or more of the contaminants calcium, chlorine, chromium, manganese, mercury, nickel, phosphorus, potassium, vanadium, and zinc.

For example, in embodiments where the target impurity includes calcium, particularly effective contaminant removal agents include combinations of sodium carboxy cellulose and polyethyleneimine, combinations of sulfonated PEEK polymer and alumina, combinations of polyethyleneimine and 4-aminonapthalenesulfonic acid, sulfonated PEEK polymer, combinations of graphene oxide and 3-(1-pyridino)-1-propanesulfonate, combinations of polyvinyl pyrrolidone functionalized with propyl sulfonate and 3-(1-pyridino)-1-propanesulfonate, combinations of dimethyldiallyl nanoclay and 3-(1-pyridino)-1-propanesulfonate, combinations of sodium carboxy cellulose and 3-(1-pyridino)-1-propanesulfonate, and combinations of sulfonated PEEK polymer and 3-(1-pyridino)-1-propanesulfonate.

In embodiments where the target impurity includes chlorine, preferable contaminant removal agents include combinations of polyvinyl pyrrolidone functionalized with propyl sulfonate and 3-(1-pyridino)-1-propanesulfonate, dimethyldiallyl nanoclay, combinations of sodium carboxy cellulose and 3-(1-pyridino)-1-propanesulfonate, $NH_2$ functionalized graphene, alumina, and graphene oxide.

If chromium is included in the target impurity, the following contaminant removal agents are particularly effective: combinations of sodium carboxy cellulose and polyethyleneimine, combinations of polyvinyl pyrrolidone functionalized with propyl sulfonate and $NH_3$ functionalized graphene oxide, polyethyleneimine, and sulfonated PEEK polymer.

If manganese is included in the target impurity, suitable contaminant removal agents include polyvinyl pyrrolidone functionalized with sodium salt of chloroacetic acid, poly (ethylene glycol) diamine, boron nitride, alumina, sodium carboxy cellulose, zinc oxide, ammonium-functionalized silica nanoparticles, $NH_2$ functionalized graphene, sulfonated PEEK polymer, iron (III) oxide, carbon nitride, combinations of graphene oxide and 3-(1-pyridino)-1-propanesulfonate, octadecylphosphonic acid, 4-aminonapthalenesulfonic acid, and combinations of sulfonated PEEK polymer and 3-(1-pyridino)-1-propanesulfonate.

In embodiments where the target impurity includes mercury, combinations of $NH_3$ functionalized graphene oxide and polyvinyl pyrrolidone functionalized with propyl sulfonate are particularly desirable.

If phosphorous is included in the target impurity, desirable contaminant removal agents include the following: oxidized carbon particles, combinations of sulfonated PEEK polymer and 3-(1-pyridino)-1-propanesulfonate, iron (III) oxide, combinations of dimethyldiallyl nanoclay and 3-(1-pyridino)-1-propanesulfonate, combinations of alumina and graphene oxide, combinations of alumina and 3-(1-pyridino)-1-propanesulfonate, combinations of polyvinyl pyrrolidone functionalized with propyl sulfonate and 3-(1-pyridino)-1-propanesulfonate, $O_2$ rich multiwalled carbon nanotube (MWCNT), combinations of bentonite and 3-(1-pyridino)-1-propanesulfonate, 3-(1-pyridino)-1-propanesulfonate, polyvinyl pyrrolidone functionalized with sodium salt of chloroacetic acid, sulfonated PEEK polymer, graphene oxide, magnesium oxide, and combinations of phyllosilicate and graphene oxide.

In yet other embodiments, if the target impurity includes potassium, preferred contaminant removal agents include combinations of graphene oxide and 4-aminonapthalenesulfonic acid, combinations of dimethyldiallyl nanoclay and 3-(1-pyridino)-1-propanesulfonate, alumina, sodium carboxy cellulose, 3-(1-pyridino)-1-propanesulfonate, alumina, sodium carboxy, cellulose, 3-(1-pyridino)-1-propanesulfonate, dimethyldiallyl nanoclay, combinations of bentonite and 3-(1-pyridino)-1-propanesulfonate, and combinations of sodium carboxy cellulose and polyethyleneimine.

In embodiments where the target impurity includes nickel or vanadium, particularly useful contaminant removal agents include combinations of sulfonated PEEK polymer and polyvinyl pyrrolidone functionalized with propyl sulfonate.

For zinc contaminants, desirable contaminant removal agents include sulfonated PEEK polymer, as well as polyvinyl pyrrolidone functionalized with propyl sulfonate.

Although the above contaminants are listed individually, it will be appreciated that the contaminant removal agent may address multiple contaminants in the target impurity at the same time. The following is a non-exhaustive listing of examples.

Combinations of polyvinyl pyrrolidone functionalized with propyl sulfonate and 3-(1-pyridino)-1-propanesulfonate, for example, address calcium, chlorine, and/or phosphorous simultaneously.

Combinations of sodium carboxy cellulose and 3-(1-pyridino)-1-propanesulfonate also address calcium and chlorine together.

Combinations of sodium carboxy cellulose and polyethyleneimine address calcium, chromium, and/or potassium together.

Combinations of dimethyldiallyl nanoclay and 3-(1-pyridino)-1-propanesulfonate address calcium, potassium, and/or phosphorous at once.

Combinations of sulfonated PEEK polymer and 3-(1-pyridino)-1-propanesulfonate are useful contaminant removal agents in embodiments where the target impurity includes calcium, manganese, and/or phosphorus.

Sulfonated PEEK polymer simultaneously addresses the removal of chromium and/or zinc in addition to calcium, manganese, and/or phosphorus.

Combinations of graphene oxide and 3-(1-pyridino)-1-propanesulfonate address calcium and manganese at the same time.

Alumina simultaneously addresses chlorine, potassium, and/or manganese.

Dimethyldiallyl nanoclay is a useful contaminant removal agent to address both chlorine and potassium.

$NH_2$ functionalized graphene addresses chlorine and manganese at the same time.

To address both potassium and manganese together, sodium carboxy cellulose is useful in the contaminant removal agent.

Either 3-(1-pyridino)-1-propanesulfonate or a combination of bentonite and 3-(1-pyridino)-1-propanesulfonate is useful to address potassium and phosphorous together.

Iron (III) oxide addresses manganese and phosphorous at the same time.

The solvent component of the treatment formulation may be water, organic solvents, or a combination of the same. Suitable organic solvents include but are not limited to hexane, heptane, and alcohols such as ethanol and isopropyl alcohol. In one exemplary embodiment, a combination of ethanol to water is used as the solvent. The ratio of ethanol to water may be approximately 4:1 (ethanol:water).

Depending on the fluid to be treated, one or more additives may be used alongside the contaminant removal agent. Such additives may include but are not necessarily limited to a demulsifier, a demulsifier intermediate, and a dehydrating agent. One or more of these additives may be suitable, for example, when the fluid is a crude oil and where the contaminant removal agent is introduced for treatment of the crude oil at a desalter.

In one embodiment, a method of removing a target impurity from a fluid includes the steps of identifying the target impurity in the fluid, providing a contaminant removal agent to remove the target impurity, and contacting the fluid with the contaminant removal agent. In certain embodiments, the target impurity includes one or more metals, such as calcium, chromium, manganese, mercury, potassium, nickel, vanadium, and zinc. In other embodiments, the target impurity includes one or more non-metals, such as phosphorus and chlorine. In yet other embodiments, the target impurity includes both metals and non-metals.

As part of providing the contaminant removal agent, the contaminant removal agent may be stirred or sonicated to improve the homogeneity of the solution and the dispersion of nanoparticles and/or polymers therein. In some embodiments, the contaminant removal agent is stirred or sonicated with a solvent.

In some embodiments, the method further includes a mixing step, wherein an additive is mixed with the contaminant removal agent before the step of contacting the fluid with the contaminant removal agent. In other embodiments, the additive is introduced to the fluid before or after the step of contacting the fluid with the contaminant removal agent. Suitable additives include demulsifiers, demulsifier intermediates, dehydrating agents, and mixtures of the same.

In certain embodiments where the fluid is a contaminated crude oil, the step of contacting the crude oil with the contaminant removal agent includes injecting the contaminant removal agent into a wash water used to treat the crude oil at a desalter. In other embodiments with a contaminated crude oil, contacting the crude oil involves injecting the contaminant removal agent directly into the crude oil.

Although applications for applying the contaminant removal agent to crude oil in a desalter are specifically contemplated above, it will be appreciated that the contaminant removal agent may be applied to fluids in other systems and processes to address the issue of unwanted contaminants. For example, the contaminant removal agent may be injected into fluids used in cooling water systems, petroleum production, oil recovery (well casing, pipelines), refining, geothermal wells, and other oil field applications; boiler and boiler water systems, power generation and mineral process water including washing, flotations; paper mill digesters, washers, bleach plants, white water systems, mill water systems, black liquor evaporators in the pulp and paper industry, gas scrubbers and air washers; continuous casting processes in the metallurgical industry, air conditioning and refrigeration systems; building fire protection heating water, such as pasteurization water; water reclamation and purification systems; membrane filtration water systems; food processing streams and waste treatment systems; membrane filtration water systems; food processing streams and waste treatment systems as well as in clarifiers, liquid-solid applications, municipal sewage treatment systems; and industrial or municipal water distribution systems. In an exemplary embodiment, the contaminant removal agent may be injected into a wastewater stream.

In some embodiments, the contaminant removal agent is applied to the contaminated fluid in a concentration ranging from about 1 ppm to about 5,000 ppm (contaminant removal agent/contaminated fluid). In certain embodiments, the contaminant removal agent is applied in a concentration ranging from about 10 ppm to about 1,000 ppm. In yet other embodiments, the contaminant removal agent is applied in a concentration of about 10 ppm to about 100 ppm in the contaminated fluid. In other embodiments, the concentration is about 10 ppm to about 50 ppm. In yet other embodiments, the concentration is about 10 ppm to about 30 ppm.

Example I

An extensive screen was conducted to identify nanoparticles and polymers that are able to reduce levels of problematic contaminants in fluids such as desalted crude. A Petra Max Analyser and a Clora Analyser were used to observe the performance of the screened candidates after they were tested on different crude oils to simulate desalted conditions. The Petra Max laboratory instrument used high-definition x-ray fluorescence (HDXRF) for detection of a spectrum of elements in crude oil and water samples, whereas the Clora laboratory instrument used monochromatic wavelength dispersive x-ray fluorescence (MWDXRF) for the detection of chlorine in the same.

The study identified the following nanoparticles and polymers as particularly effective for contaminant removal.

| Nanoparticles/Polymers | Contaminant | % Removed |
| --- | --- | --- |
| sulfonated PEEK | Ca | 41.6 |
| dimethyldiallyl nanoclay | Cl | 21.4 |
| $NH_2$ functionalized graphene | Cl | 21.17 |
| alumina | Cl | 20.5 |
| graphene oxide | Cl | 20.5 |
| alumina | K | 30.21 |
| sodium carboxy cellulose | K | 29.5 |
| 3-(1-pyridino)-1-propanesulfonate | K | 28 |
| dimethyldiallyl nanoclay | K | 25.9 |
| polyvinyl pyrrolidone functionalized with sodium salt of chloroacetic acid | Mn | 65.4 |
| poly(ethylene glycol) diamine | Mn | 50 |
| boron nitride | Mn | 42.3 |
| alumina | Mn | 38.9 |

-continued

| Nanoparticles/Polymers | Contaminant | % Removed |
|---|---|---|
| sodium carboxy cellulose | Mn | 38.9 |
| zinc oxide | Mn | 38.5 |
| ammonium functionalized silica nanoparticle | Mn | 38.5 |
| sodium carboxy cellulose | Mn | 34.6 |
| NH₂ functionalized graphene | Mn | 33.3 |
| sulfonated PEEK | Mn | 27.7 |
| iron (III) oxide | Mn | 27.58 |
| carbon nitride | Mn | 26.3 |
| sulfonated PEEK | Mn | 21 |
| octadecylphosponic acid | Mn | 20.7 |
| oxidized carbon | P | 37.57 |
| iron (III) oxide | P | 28.6 |
| O₂ rich MWCNT | P | 21.5 |
| 3-(1-pyridino)-1-propanesulfonate | P | 20 |
| polyvinyl pyrrolidone functionalized with sodium salt of chloroacetic acid | P | 19.3 |
| sulfonated PEEK | P | 22 |
| graphene oxide | P | 20 |
| magnesium oxide | P | 17 |
| polyethyleneimine | Cr | 20 |
| sulfonated PEEK | Cr | 17 |
| sulfonated PEEK | Zn | 20 |
| polyvinyl pyrrolidone functionalized with propyl sulfonate | Zn | 14 |

Additional tests were conducted to evaluate the performance for combinations of nanoparticles that demonstrated a synergistic relationship for contaminant removal. The leading candidates were as follows:

| Nanoparticles and/or Polymers in Combination | Contaminant | % Removed |
|---|---|---|
| sodium carboxy cellulose + polyethyleneimine | Ca | 63 |
| sulfonated PEEK + alumina | Ca | 49 |
| polyethyleneimine + 4-aminonapthalenesulfonic acid | Ca | 43.9 |
| graphene oxide + 3-(1-pyridino)-1-propanesulfonate | Ca | 34 |
| polyvinyl pyrrolidone functionalized with propyl sulfonate + 3-(1-pyridino)-1-propanesulfonate | Ca | 33 |
| dimethyldiallyl nanoclay + 3-(1-pyridino)-1-propanesulfonate | Ca | 31.8 |
| sodium carboxy cellulose + 3-(1-pyridino)-1-propanesulfonate | Ca | 24 |
| sulfonated PEEK + 3-(1-pyridino)-1-propanesulfonate | Ca | 21.25 |
| dimethyldiallyl nanoclay + 3-(1-pyridino)-1-propanesulfonate | Ca | 20.5 |
| polyvinyl pyrrolidone functionalized with propyl sulfonate + 3-(1-pyridino)-1-propanesulfonate | Cl | 30.69 |
| sodium carboxy cellulose + 3-(1-pyridino)-1-propanesulfonate | Cl | 21.08 |
| sodium carboxy cellulose + polyethyleneimine | Cr | 24.7 |
| polyvinyl pyrrolidone functionalized with propyl sulfonate + NH₃ functionalized graphene oxide | Cr | 20 |
| graphene oxide + 4-aminonapthalenesulfonic acid | K | 48 |
| dimethyldiallyl nanoclay + 3-(1-pyridino)-1-propanesulfonate | K | 45 |
| bentonite + 3-(1-pyridino)-1-propanesulfonate | K | 19.79 |
| sodium carboxy cellulose + polyethyleneimine | K | 18 |
| graphene oxide + 3-(1-pyridino)-1-propanesulfonate | Mn | 23.07 |
| sulfonated PEEK + 3-(1-pyridino)-1-propanesulfonate | P | 31.01 |
| dimethyldiallyl nanoclay + 3-(1-pyridino)-1-propanesulfonate | P | 28.2 |
| alumina + graphene oxide | P | 28 |
| alumina + 3-(1-pyridino)-1-propanesulfonate | P | 25.5 |
| polyvinyl pyrrolidone functionalized with propyl sulfonate + 3-(1-pyridino)-1-propanesulfonate | P | 22.42 |
| bentonite + 3-(1-pyridino)-1-propanesulfonate | P | 21.3 |
| sulfonated PEEK + polyvinyl pyrrolidone functionalized with propyl sulfonate | V | 5 |

-continued

| Nanoparticles and/or Polymers in Combination | Contaminant | % Removed |
|---|---|---|
| sulfonated PEEK + polyvinyl pyrrolidone functionalized with propyl sulfonate | Ni | 5 |
| polyvinyl pyrrolidone functionalized with propyl sulfonate + NH₃ functionalized graphene oxide | Hg | 21 |

In the foregoing specification, the invention has been described with reference to specific embodiments thereof. However, it will be evident that various modifications and changes can be made thereto without departing from the broader scope of the invention as set forth in the appended claims. Accordingly, the specification is to be regarded in an illustrative rather than a restrictive sense. For example, different contaminant removal agents, fluids, contaminants, treatment procedures, proportions, dosages, and amounts not specifically identified or described in this disclosure or not evaluated in a particular Example are still expected to be within the scope of this invention.

The present invention may suitably comprise, consist of, or consist essentially of the elements disclosed and may be practiced in the absence of an element not disclosed. As used herein, the singular forms "a," "an," and "the" are intended to include the plural forms as well, unless the context clearly indicates otherwise. As used herein, the term "about" in reference to a given parameter is inclusive of the stated value and has the meaning dictated by the context (e.g., it includes the degree of error associated with measurement of the given parameter). As used herein, the term "and/or" includes any and all combinations of one or more of the associated listed items.

It is claimed:

1. A treatment formulation for removing a target impurity from a system, wherein the treatment formulation comprises:

a contaminant removal agent comprising at least one nanoparticle compound wherein the at least one nanoparticle compound is selected from the group consisting of carbon nitride, boron nitride, bentonite, and combinations of the same; and a solvent.

2. The treatment formulation of claim 1 further comprising at least one polymer, wherein the at least one polymer is selected from the group consisting of sulfonated polyether ether ketone (PEEK) polymer, sodium carboxy cellulose, poly(ethylene glycol) diamine, polyvinyl pyrrolidone functionalized with sodium salt of chloroacetic acid, polyvinyl pyrrolidone functionalized with propyl sulfonate, and polyethyleneimine.

3. The treatment formulation of claim 1 further comprising at least one polymer, wherein the at least one polymer is one or more surfactants selected from the group consisting of 4-aminonapthalenesulfonic acid, 3-(1-pyridino)-1-propanesulfonate, and octadecylphosphonic acid.

4. A treatment formulation for removing a target impurity from a system, wherein the treatment formulation comprises:

a contaminant removal agent comprising at least one polymer, wherein the at least one polymer is selected from the group consisting of sodium carboxy cellulose, polyvinyl pyrrolidone functionalized with sodium salt of chloroacetic acid, polyethyleneimine, 4-aminonapthalenesulfonic acid, and combinations of the same; and a solvent.

5. The treatment formulation of claim 4, wherein the contaminant removal agent comprises a combination selected from the group consisting of:

a combination of sodium carboxy cellulose and polyethyleneimine, a combination of polyethyleneimine and 4-aminonapthalenesulfonic acid, and a combination of sodium carboxy cellulose and 3-(1-pyridino)-1-propanesulfonate.

6. The treatment formulation of claim 4 further comprising at least one nanoparticle compound, wherein the at least one nanoparticle compound is selected from the group consisting of nitrides, oxide nanoparticles, clays, carbon-based nanoparticles, and combinations of the same.

7. A method of removing a target impurity from a fluid, wherein the method comprises the steps of:

identifying the target impurity in the fluid;

providing a contaminant removal agent to remove the target impurity, wherein the contaminant removal agent comprises:

at least one polymer; and at least one nanoparticle compound, wherein the at least one nanoparticle compound is selected from the group consisting of carbon nitride, boron nitride, bentonite, and combinations of the same; and contacting the fluid with the contaminant removal agent.

8. The method of claim 7, wherein the target impurity comprises potassium, and wherein the at least one polymer is 3-(1-pyridino)-1-propanesulfonate and the least one nanoparticle compound is bentonite.

9. The method of claim 7, wherein the target impurity comprises phosphorus, and wherein the at least one polymer is 3-(1-pyridino)-1-propanesulfonate and the least one nanoparticle compound is bentonite.

10. The method of claim 7, wherein the fluid is a crude oil, and wherein the step of contacting the fluid with the contaminant removal agent further comprises injecting the contaminant removal agent into a wash water used to treat the crude oil at a desalter.

11. The method of claim 7, wherein the fluid is a wastewater stream, and wherein the step of contacting the fluid with the contaminant removal agent further comprises injecting the contaminant removal agent into the wastewater stream.

12. The treatment formulation of claim 1, wherein the solvent is selected from the group consisting of hexane, heptane, ethanol, isopropyl alcohol, water, and combinations of the same.

13. The treatment formulation of claim 1, further comprising a demulsifier, a demulsifier intermediate, or a dehydrating agent.

14. The treatment formulation of claim 2, wherein the at least one polymer is sodium carboxy cellulose or polyvinyl pyrrolidone functionalized with sodium salt of chloroacetic acid.

15. The treatment formulation of claim 3, wherein the at least one polymer is 4-aminonapthalenesulfonic acid.

16. The treatment formulation of claim 3, wherein the at least one polymer is 3-(1-pyridino)-1-propanesulfonate and the at least one nanoparticle is bentonite.

17. The treatment formulation of claim 6, wherein the at least one polymer is 4-aminonapthalenesulfonic acid and the at least one nanoparticle compound is an oxide nanoparticle, which is graphene oxide.

18. The treatment formulation of claim 6, wherein the at least one nanoparticle compound is a nitride selected from the group consisting of carbon nitride and boron nitride or is a clay selected from bentonite.

19. The method of claim 7, wherein the at least one polymer is selected from the group consisting of sodium carboxy cellulose, polyvinyl pyrrolidone functionalized with sodium salt of chloroacetic acid, 4-aminonapthalenesulfonic acid, and combinations of the same.

\* \* \* \* \*